United States Patent [19]

Yamamoto et al.

[11] Patent Number: 5,860,344
[45] Date of Patent: Jan. 19, 1999

[54] CUTTING APPARATUS FOR PHOTOSENSITIVE MATERIAL PROCESSOR AND CUTTING METHOD

[75] Inventors: Takashi Yamamoto; Takao Fukuda, both of Kanagawa, Japan

[73] Assignee: Fuji Photo Film Co., Ltd., Kanagawa, Japan

[21] Appl. No.: 907,059

[22] Filed: Aug. 6, 1997

Related U.S. Application Data

[63] Continuation of Ser. No. 315,481, Sep. 30, 1994, abandoned.

[30] Foreign Application Priority Data

Oct. 15, 1993  [JP]  Japan ................ 5-258447

[51] Int. Cl.⁶ ........................................ B26D 7/00
[52] U.S. Cl. .................... 83/365; 83/367; 83/369; 83/370
[58] Field of Search ............. 83/365, 367, 369, 83/370, 210, 209

[56] References Cited

U.S. PATENT DOCUMENTS

| | | | |
|---|---|---|---|
| 3,599,521 | 8/1971 | Lee | 83/210 |
| 3,718,394 | 2/1973 | Tysko et al. | 83/365 X |
| 3,933,069 | 1/1976 | Tall et al. | 83/367 X |
| 3,967,518 | 7/1976 | Edwards | 83/210 |
| 4,221,144 | 9/1980 | Diesch et al. | 83/365 X |
| 4,297,930 | 11/1981 | Putzke | 83/370 X |
| 4,436,008 | 3/1984 | Strunc | 83/210 X |
| 4,566,785 | 1/1986 | Takenouchi | 226/176 X |
| 4,928,897 | 5/1990 | Satou et al. | 242/564.4 |
| 4,943,270 | 7/1990 | Fleckenstein | 83/367 X |
| 4,960,248 | 10/1990 | Bauer et al. | 242/564.4 |
| 4,972,743 | 11/1990 | Nojima | 83/367 X |
| 5,153,661 | 10/1992 | Shimizu et al. | 83/209 X |
| 5,172,618 | 12/1992 | Moriya et al. | 83/365 X |
| 5,187,531 | 2/1993 | Ozawa et al. | 242/563 X |
| 5,229,827 | 7/1993 | Sato et al. | 83/104 X |

FOREIGN PATENT DOCUMENTS

| | | | |
|---|---|---|---|
| 61-90159 | 5/1986 | Japan | 83/370 |
| 63-58442 | 3/1988 | Japan | 242/564.4 |
| 63-123752 | 5/1988 | Japan | 242/564.4 |
| 62-329129 | 7/1989 | Japan | 83/369 |
| 1-293345 | 11/1989 | Japan | 83/369 |
| 2-89755 | 3/1990 | Japan | 242/564.4 |
| 3-272955 | 12/1991 | Japan | 242/564.4 |
| 502363 | 2/1976 | U.S.S.R. | 242/348 |
| 0562675 | 9/1993 | United Kingdom | 83/614 |
| 562675 | 9/1993 | United Kingdom | 83/614 |

*Primary Examiner*—M. Rachuba
*Attorney, Agent, or Firm*—Sughrue, Mion, Zinn, Macpeak & Seas, PLLC

[57] ABSTRACT

A cutting apparatus for a photosensitive material processor. A cutting member cuts the photosensitive material fed out from a magazine to a main body of the processor by a transporting device. A detecting device detects a leading end portion of the photosensitive material fed out from the magazine by the transporting device, the detection being carried out at a position upstream of the cutting member in a traveling direction of the photosensitive material. A controlling device controls the operation of the cutting member on the basis of an amount of the photosensitive material fed out by the driving member until the photosensitive material is detected by the detecting device, so as to adjust the length of the photosensitive material to be cut by the cutting member. Since the length of the photosensitive material to be cut by the cutting member is adjusted on the basis of the amount of the photosensitive material fed out, it is possible to prevent the photosensitive material from being wasted by being cut by an unnecessary amount.

20 Claims, 4 Drawing Sheets

CUTTING APPARATUS FOR PHOTOSENSITIVE MATERIAL PROCESSOR AND CUTTING METHOD

This is a Continuation of application Ser. No. 08/315,481 filed Sep. 30, 1994 now abandoned.

BACKGROUND OF THE INVENTION

1. Field of the Invention

The present invention relates to a cutting apparatus for a photosensitive material processor and a cutting method which make it possible to control the amount of a photosensitive material to be cut in correspondence with the state of the photosensitive material. The present invention applies to a photographic processor, such as a photographic printer or a printer processor in which a printer section and a processor section are integrated.

2. Description of the Related Art

In a printer (printer section) for printing images from a negative film onto a photographic printing paper which is a photosensitive material, a paper magazine, in which a printing paper taken up in advance in roll form, is loaded in the printer. The printing paper is then fed out from inside the paper magazine, and is transported to a printing position to print images. Subsequently, the printing paper is transported to a developing apparatus (processor section) located downstream of the printer in a transport passage, to be subjected to development processing.

With conventional printers, the printing paper is cut for each image after the development of the printing paper. In such a system, however, when the paper magazine is replaced, there is a drawback in that the amount of printing paper rewound into the paper magazine as well as the amount thereof fed out from inside the paper magazine increase. Accordingly, a system has been devised in which a cutter section is disposed in the vicinity of the paper magazine. In the noted system, the printing paper is advanced to a printing position after the printing paper has been cut in advance in the cutter section to the size of each image that is to be printed.

Meanwhile, since various sizes are present for the images to be printed, there is a need to replace the paper magazine accommodating the printing paper and load another paper magazine in the printer, to change the type of printing paper in correspondence with the size of the image to be printed. In addition, the length of the printing paper in the paper magazine is limited. Therefore, when the printing paper in the paper magazine has been used up, there is a need to remove the paper magazine temporarily from the printer and accommodate a new printing paper in the paper magazine, and then to load the paper magazine into the printer.

At the time of such replacement of the paper magazine in the above-described manner, it is necessary to position a leading end portion of the printing paper in the printer before print processing. It is also necessary to remove a fogged portion of the printing paper which projects from the paper magazine and therefore has been exposed. For this reason, in the above printer it is conceivable to freely transport in advance a fixed amount of the printing paper from the paper magazine inside the printer, and to cut the leading end portion in the cutter section before starting the print processing of images.

However, the position of the leading end portion of the printing paper with respect to the paper magazine generally differs substantially in cases where the type of printing paper is changed and in cases where the printing paper is replaced by one which is newly accommodated in the paper magazine. Also, there is a difference in the presence or absence of a fogged portion as a consequence of the above-described difference. Therefore, there has been a drawback in that the printing paper is wasted if the printing paper is cut uniformly after being freely transported by a fixed amount.

SUMMARY OF THE INVENTION

Accordingly, in accordance with a first aspect of the present invention, there is provided a cutting apparatus for a photosensitive material processor, comprising: a magazine having an elongated photosensitive material disposed therein, the magazine being detachably loaded in a main body of the processor for processing the photosensitive material; a transporting device disposed in the magazine to feed out the photosensitive material from within the magazine to the main body of the processor, while nipping the photosensitive material; a driving member connected to the transporting device to drive the transporting device; a cutting member for cutting the photosensitive material fed out from the magazine to the main body of the processor; a detecting device for detecting a leading end portion of the photosensitive material fed out from the magazine by the transporting device, the detection being carried out at a position upstream of the cutting member in a traveling direction of the photosensitive material: and a controlling device for controlling the operation of the cutting member based on an amount of the photosensitive material fed out from the magazine by the driving member until the photosensitive material is detected by the detecting device, thereby to adjust the length of the photosensitive material to be cut by the cutting member.

In accordance with a second aspect of the present invention, there is provided a cutting apparatus for a photosensitive material processor, comprising: a magazine having an elongated photosensitive material disposed therein, the magazine being detachably loaded in a main body of the processor for processing the photosensitive material; a transporting device disposed in the magazine to feed out the photosensitive material from within the magazine to the main body of the processor, while nipping the photosensitive material; a driving member connected to the transporting device to drive the transporting device; a cutting member for cutting the photosensitive material fed out from the magazine to the main body of the processor; a detecting device for detecting a leading end portion of the photosensitive material fed out from the magazine by the transporting device, the detection being carried out at a position upstream of the cutting member in a traveling direction of the photosensitive material; and a controlling device for controlling the operation of the cutting member based on an amount of the photosensitive material fed out from the magazine by the driving member until the photosensitive material is detected by the detecting device, such that if it is determined that the leading end portion of the photosensitive material projects from the magazine before loading the magazine into the main body of the processor, the controlling device controls operation of the cutting member so that the projecting leading end portion of the photosensitive material is cut into pieces through a number of cutting operations, while if it is determined that the leading end portion of the photosensitive material does not project from the magazine before loading the magazine into the main body of the processor, the controlling device controls operation of the cutting member so that the leading end portion of the photosensitive material is cut once.

In accordance with a third aspect of the present invention, there is provided a method of cutting a photosensitive material, comprising the steps of:

provjding a magazine having an elongated photosensitive material disposed therein, the magazine being detachably loaded in a main body of a processor for processing the photosensitive material; a transporting device disposed in the magazine to feed out the photosensitive material from within the magazine to the main body of the processor, while nipping the photosensitive material; a driving member connected to the transporting device to drive the transporting device; a cutting member for cutting the photosensitive material fed out from the magazine to the main body of the processor; a detecting device for detecting a leading end portion of the photosensitive material fed out from the magazine by the transporting device; the detection being carried out at a position upstream of the cutting member in a traveling direction of the photosensitive material; and a controlling device for controlling the operation of the cutting member based on an amount of the photosensitive material fed out of the magazine by the driving member until the photosensitive material is detected by the detecting device, thereby to adjust the length of the photosensitive material to be cut by the cutting member;

feeding out the photosensitive material by means of the transporting device;

detecting the leading end portion of the photosensitive material being fed out, by means of the detecting device;

detecting the amount of the photosensitive material fed out, on the basis of the detection; and controlling the driving of the cutting member on the basis of the detected amount of the photosensitive material fed out.

A description will be given hereafter of the operation of the cutting apparatus for a photosensitive material processor in accordance with the first aspect of the present invention.

The transporting device, which is disposed in the magazine with an elongated photosensitive material accommodated therein, is driven by the driving member, so as to feed out the photosensitive material from within the magazine to the main body of the processor for processing the photosensitive material, while nipping the photosensitive material.

If the detecting device detects the leading end portion of the photosensitive material being fed from the magazine by the transporting device, the cutting member is actuated to cut the photosensitive material. At this time, the controlling device controls the operation of the cutting member on the basis of the amount of the photosensitive material fed out by the driving member until the photosensitive material is detected by the detecting device, so as to adjust the length of the photosensitive material to be cut by the cutting member.

Accordingly, if the leading end portion of photosensitive material projects from the magazine before loading the magazine, the amount of projection of the photosensitive material can be determined from the amount of photosensitive material fed out. Hence, it is possible to cut off only the leading end portion of the photosensitive material projecting from inside the magazine.

In other words, since the amount of the photosensitive material being advanced freely can be controlled in accordance with the amount of photosensitive material projected, it is possible to position the leading end portion of the photosensitive material while preventing the photosensitive material from being wasted by being cut by an unnecessary amount.

A description will be given hereafter of the operation of the cutting apparatus for a photosensitive material processor in accordance with the second aspect of the present invention.

In the second aspect of the present invention, the controlling device controls the operation of the cutting member on the basis of the amount of the photosensitive material fed out by the driving member until the photosensitive material is detected by the detecting device. If the leading end portion of the photosensitive material projects from the magazine before loading of the magazine into the main body of the processor, the projecting portion of the photosensitive material is cut into small pieces through a number of cutting operations. Meanwhile, if the leading end portion of the photosensitive material does not project from the magazine before loading of the magazine into the main body of the processor, the leading end portion of the photosensitive material is cut only once.

Accordingly, in the same way as in the first aspect of the present invention, the amount of projection of the photosensitive material before loading can be determined from the amount of the photosensitive material advanced. In addition, the leading end portion of the photosensitive material projecting from the magazine in advance is cut into small pieces through a number of cutting operations. Therefore, it is possible to position the leading end portion of the photosensitive material, and large cuttings of the photosensitive material are not produced, thereby facilitating the discharge of the cuttings from inside the main body of the processor having a narrow space.

Meanwhile, if the leading end portion of the photosensitive material does not project from the magazine before loading of the magazine into the main body of the processor, the leading end portion of the photosensitive material can be positioned by cutting the leading end portion of the photosensitive material only once. Consequently, the waste of the photosensitive material can be minimized.

A description will be given hereafter of the method of cutting a photosensitive material in accordance with the third aspect of the present invention.

In accordance with the third aspect of the present invention, the driving of the cutting member is controlled based on the detected amount of the photosensitive material advanced. Accordingly, the amount of the photosensitive material to be cut can be controlled on the basis of the amount of the photosensitive material advanced, so that the photosensitive material is not wasted.

The above and other objects, features and advantages of the present invention will become more apparent from the following detailed description of the invention when read in conjunction with the accompanying drawings.

DESCRIPTION OF THE PREFERRED EMBODIMENT

A photographic printer, to which an embodiment of a cutting apparatus for a photosensitive material processor is applied in accordance with the present invention, and a paper magazine incorporated therein are illustrated in FIGS. 1 through 4. Referring to these drawings, a detailed description will be given of the embodiment.

Figure 1:
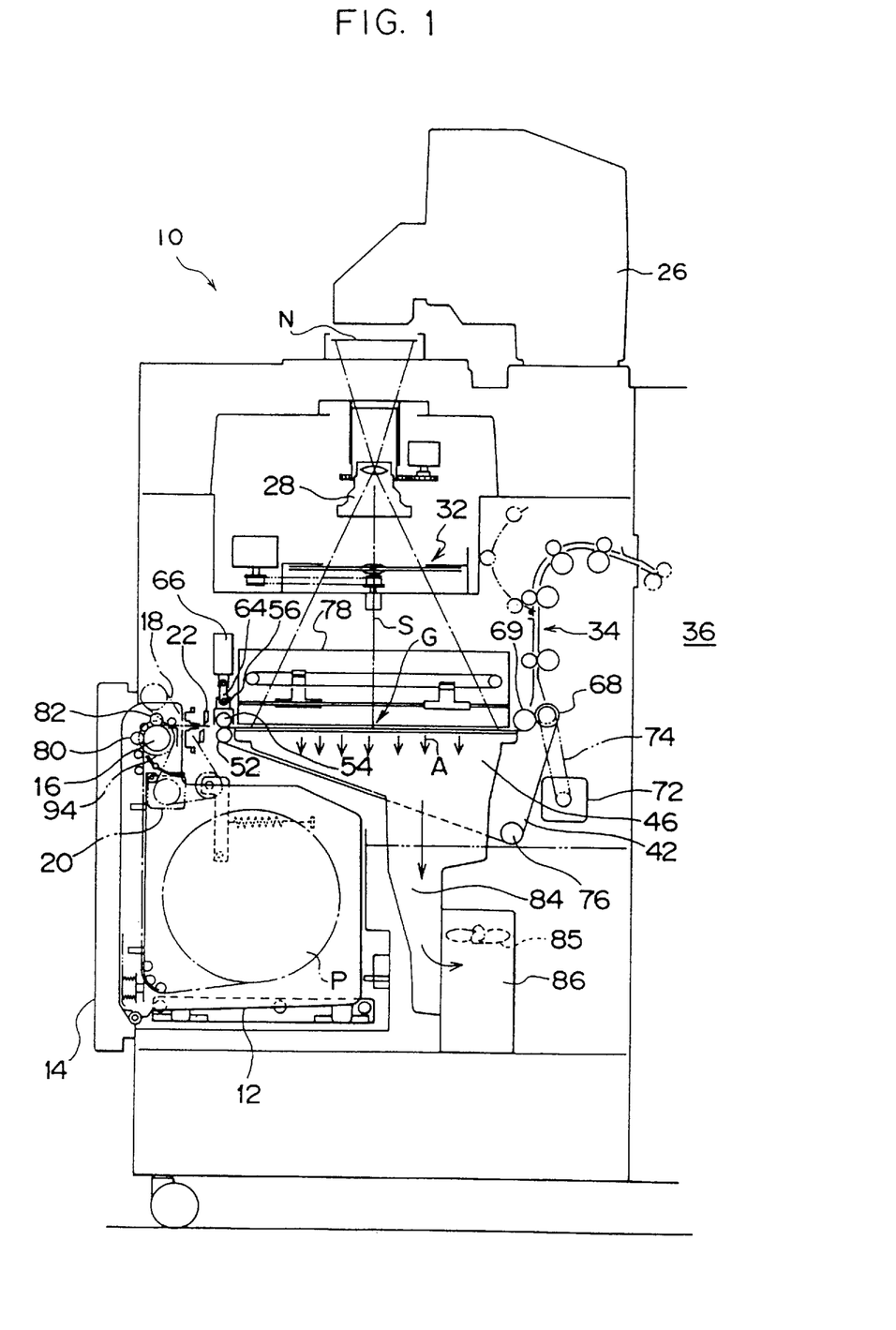
FIG. 1 is a schematic diagram of a photographic printer to which an embodiment of a cutting apparatus for a photosensitive material processor is applied in accordance with the present invention.

FIG. 1 shows a photographic printer 10 in accordance with the embodiment of the present invention. The photographic printer 10 constituting a printer section of a photographic processor is constructed such that a paper magazine 12 with a photographic printing paper P accommodated therein can be loaded into the photographic printer 10. If door 14 is closed after the insertion of the paper magazine 12 into the photographic printer 10, the photographic printer 10 is set in a loading-completed state. Accordingly, the photographic printer 10 becomes an apparatus body for processing the printing paper P.

Figure 2:
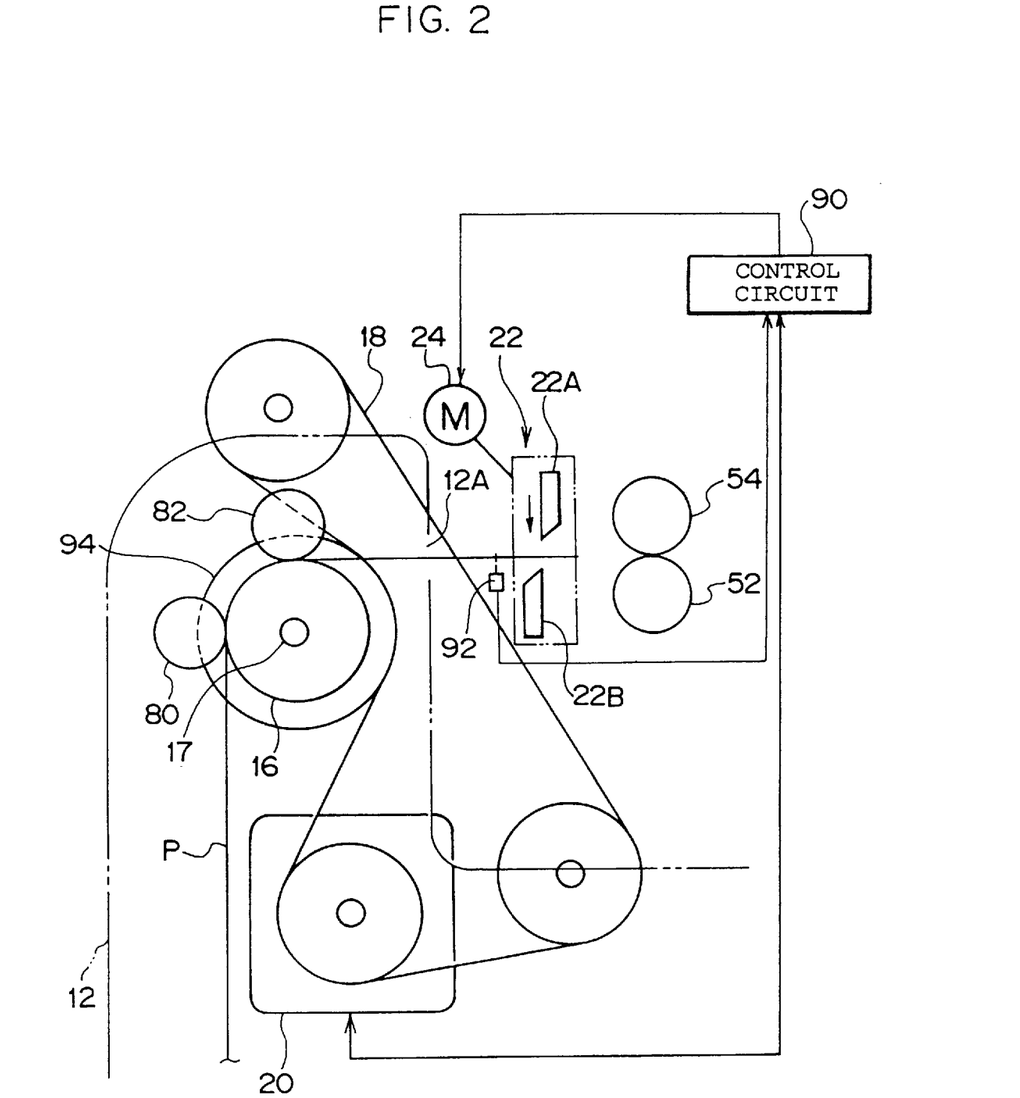
FIG. 2 is a schematic enlarged view of a cutter and surrounding structure shown in FIG. 1, and illustrates a state in which a leading end portion of a printing paper projects from a paper magazine.

A driving roller 16, around which a portion of the printing paper P in the vicinity of a leading end portion thereof is wound, is rotatably supported in the paper magazine 12 at an upper left portion thereof. As shown in FIG. 2, a pulley 94 is attached to a rotating shaft 17 constituting an axial portion of the driving roller 16.

A driving belt 18, i.e., a timing belt, is wound around the pulley 94. The driving roller 16 is rotated by a motor 20, the driving force of which is transmitted to the driving roller 16 by means of the driving belt 18. The motor 20 is provided with an unillustrated encoder for detecting the amount of rotation of the motor 20, and the encoder is electrically connected to a control circuit 90 (shown in FIG. 2) which is a controlling means. For this reason, information on the amount of rotation of the motor 20 is transmitted to the control circuit 90. Incidentally, a timer (not shown) capable of measuring the elapse of time is incorporated in the control circuit 90.

Two nip rollers 80 and 82 are disposed on the outer periphery of the driving roller 16. The driving roller 16 is adapted to nip the printing paper P together with the nip rollers 80 and 82 to feed the printing paper P into the photographic printer 10. In other words, the driving roller 16 and the nip rollers 80 and 82 constitute a transporting device for feeding out the printing paper P while nipping the same.

Thus, in the loading-completed state shown in FIG. 1, the driving roller 16 and the nip rollers 80 and 82 nip and transport the printing paper P in such a manner as to feed the leading end portion of the printing paper P into the photographic printer 10.

Meanwhile, as shown in FIG. 2, guillotine cutter 22 (hereafter simply referred to as the cutter 22) having an upper blade 22A and a lower blade 22B is disposed in the photographic printer 10. A motor 24 is electrically connected to the upper blade 22A so as to move the blade 22A vertically as the motor 24 rotates forwardly and reversely. Accordingly, the cutter 22 cuts the printing paper P which has been fed out from the paper magazine 12. Further, the motor 24 is electrically connected to the control circuit 90, so that the operation of the cutter 22, including the actuation and stopping thereof, is controlled by the control circuit 90.

As shown in FIG. 2, a reflection-type sensor 92 is disposed between the cutter 22 and the paper magazine 12 to detect the leading end portion of the printing paper P nipped and fed out from inside the paper magazine 12 by the driving roller 16 and the nip rollers 80 and 82. This sensor 92 is electrically connected to the control circuit 90 and is adapted to send a detection signal to the control circuit upon detection of the printing paper P. On the basis of this detection signal, the control circuit 90 controls the rotation of the motor 24, thereby controlling the operation of the cutter 22.

As shown in FIG. 1, a support table 46 whose upper surface extends in the horizontal direction (i.e., in the left-and-right direction in FIG. 1) is disposed on the right-hand side of the cutter 22, i.e., on the downstream side in the traveling direction of the printing paper P. A winding roller 52 around which an endless belt 42 is wound is disposed between the support table 46 and the cutter 22 with the axial direction of the winding roller 52 extending in the horizontal direction (i.e., in a direction perpendicular to the plane of the drawing of FIG. 1). A lifting roller 54 for nipping the endless belt 42 together with the winding roller 52 is disposed on the upper side of the winding roller 52 with the axial direction of the lifting roller 54 extending in parallel with that of the winding roller 52.

Axially opposite ends of the lifting roller 54 are each supported axially by an arm 56, which in turn is connected to a self-holding type solenoid 66 via a link 64. Accordingly, when an energizing pulse voltage is supplied to the solenoid 66 to actuate the solenoid 66, the arm 56 is raised, so that the lifting roller 54 is spaced apart from the endless belt 42.

Meanwhile, when a pulse voltage for reverse operation is supplied to the solenoid 66 to actuate the arm 56, the lifting roller 54 is brought into contact with the endless belt 42 on the winding roller 52 by an urging force of an unillustrated spring, so as to nip the printing paper P together with the endless belt 42.

A guide roller 68, around which the endless belt 42 is wound, is located downstream of the support table 46 in the traveling direction of the printing paper P. A guide roller 69 is disposed adjacent to the guide roller 68 such that a downward most portion of the guide roller 69 is substantially at the same height as an upward most portion of the winding roller 52. The guide roller 69 is pressed against the outer periphery of the endless belt 42.

Namely, as shown in FIG. 1, the endless belt 42 is wound around the outer periphery of the guide roller 69 by approximately one-fourth of its circumference, and the endless belt 42 is subsequently wound around the outer periphery of the guide roller 68 by approximately two-thirds of its circumference. As a result, this portion of the endless belt 42 is formed in the shape of the letter S. Further, the endless belt 42 is wound around a tension roller 76 below the guide roller 68, so that a path of movement shaped in the form of an inverted triangle is formed together with the winding roller 52.

Meanwhile, as a driving force of a motor 72 is transmitted to roller 68 by means of a timing belt 74, the guide roller 68 is rotatively driven to in turn drive the endless belt 42 clockwise in FIG. 1.

Accordingly, the printing paper P fed out from the paper magazine 12 is cut to a desired length by the cutter 22, and is then carried on the endless belt 42 and is transported to an image printing position G, which is a position on an optical axis S of printing light. As the printing light from a light source 26 reaches the printing paper P through an optical device 28 and a shutter 32, an image recorded on a negative film N is printed onto the printing paper P, and the portion with the image printed thereon becomes a printed image.

Further, the printing paper P for which the printing of the image has been completed is nipped by the guide roller 68 and the guide roller 69, and its direction of travel is shifted upwardly along a transport passage 34 from the horizontal direction. Subsequently, the printing paper P is sent to a developing apparatus 36 where the printed image is subjected to development.

The endless belt 42 is provided with a multiplicity of small holes (not shown) over its entire area, while a multiplicity of holes (not shown) are formed in an upper surface of the support table 46 on which a portion of the endless belt 42 is placed, in order to allow the printing paper P to be placed in a horizontal state at the image printing position G.

The interior of the support table 46 is formed in a hollow shape, and a pair of communicating ducts 84 (only one is shown in the drawing) corresponding to the transverse ends of the endless belt 42 are connected to the support table 46. These communicating ducts 84 detour a turned-up portion of the endless belt 42, which is arranged on the lower side of the support table 46, and the communicating ducts 84 are led to a position below the endless belt 42. The communicating ducts 84 are further extended downward, and are connected to a fan box 86 in which a suction fan 85 is provided.

As a result, the air inside the support table 46 is drawn in the transverse direction of the endless belt 42 from inside the loop of the endless belt 42 through the communicating ducts 84, and is sucked by the suction fan 85 and is blown to the outside. Consequently, the interior of the support table 46 is held under negative pressure. This negative pressure is transmitted to the printing paper P on the endless belt 42 through the holes in the support table 46 and the small holes in the endless belt 42, so that the printing paper P is sucked onto the endless belt 42, as shown by the arrows A.

For this reason, since the printing paper P is not only carried on the endless belt 42, but also sucked toward the endless belt 42, the printing paper P is transported reliably by the endless belt 42.

Incidentally, as shown in FIG. 1, an easel device 78 is provided above the endless belt 42 moving on the support table 46, so as to cover the periphery of the printing paper P in a case where an image requiring a border is printed onto the printing paper P.

Next, a description will be given of the operation of this embodiment.

First, the operator accommodates the printing paper P in the paper magazine 12 in, for instance, a darkroom. At this time, as shown in FIGS. 1 and 2, the leading end portion of the printing paper P is not only passed between the driving roller 16 and the nip rollers 80 to nip the printing paper P reliably between the driving roller 16 and the nip rollers 80, 82, but also sent out from a magazine opening 12A to allow in advance the leading end portion of the printing paper P to project from the magazine opening 12A. Consequently, a fogged portion occurs in the leading end portion of the printing paper P projecting from the paper magazine 12.

Subsequently, after the paper magazine 12 is loaded in the photographic printer 10, the initial operation of the photographic printer 10 is executed to remove the fogged leading end portion of the printing paper P, as described below.

First, the driving roller 16 disposed in the paper magazine 12 is driven at a fixed speed by the motor 20 by means of the driving belt 18, and nips the printing paper P together with the nip rollers 80 and 82. As a result, the printing paper P is transported at a fixed speed from inside the paper magazine 12 to the main-body side of the photographic printer 10 for processing the printing paper P.

Figure 3:
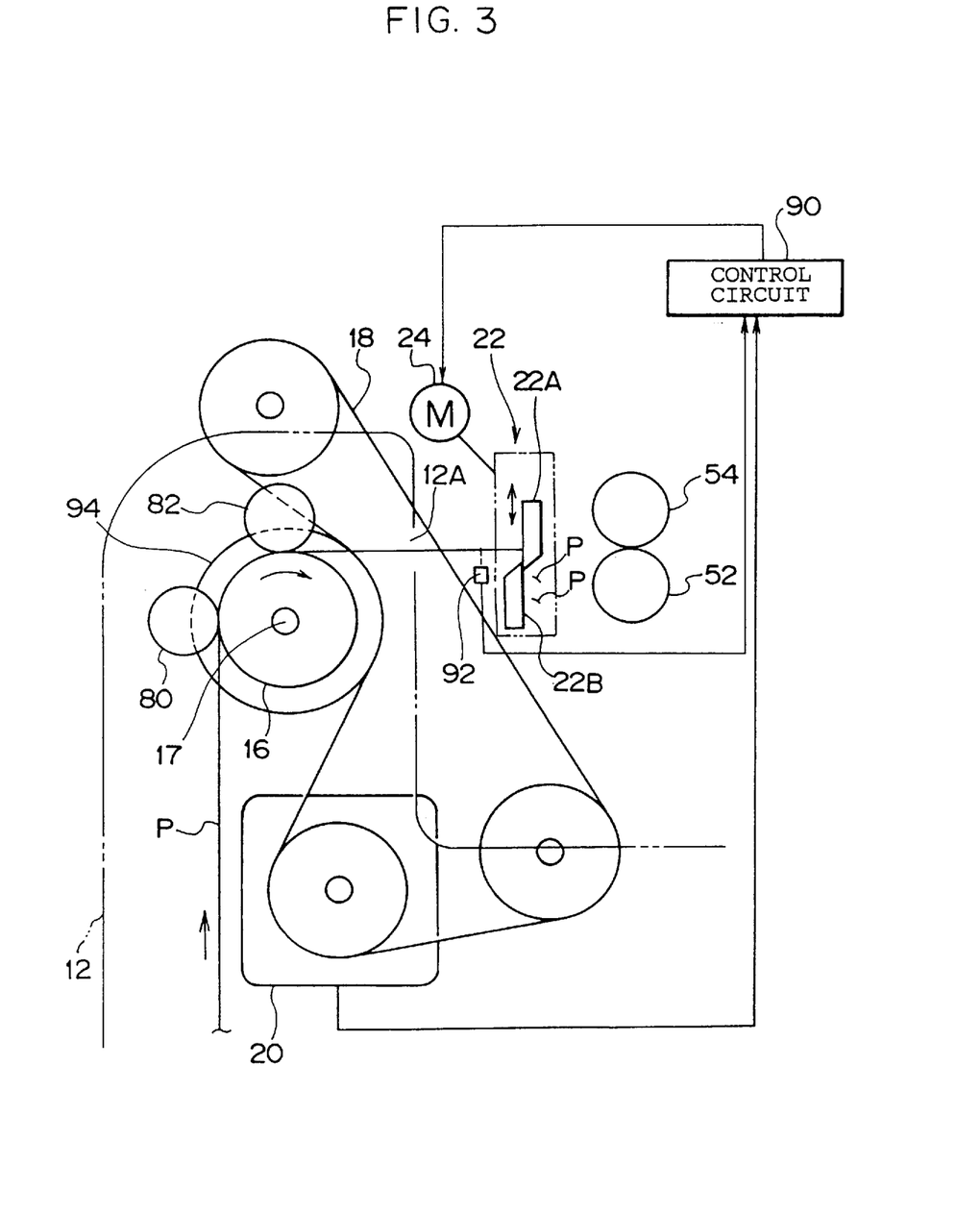
FIG. 3 is a schematic enlarged view of the cutter and surrounding structure shown in FIG. 1, and illustrates a state in which the leading end portion of the printing paper has been cut by a cutter.

If the leading end portion of the printing paper P which is thus fed by the driving roller 16 from inside the paper magazine 12 is detected by the sensor 92, as shown in FIG. 3, the cutter 22 is operated as the motor 24 rotates, thereby cutting the printing paper P. At this time, the amount of printing paper P transported by the driving roller 16 from the time the feeding of the printing paper P by the driving roller 16 is started until the printing paper P is detected by the sensor 92 is detected by the timer in the control circuit 90 in the form of a time duration. The control circuit 90 controls the operation of the cutter 22 on the basis of the time duration until the leading end portion of the printing paper P is detected by the sensor 92, so as to adjust the length of the printing paper P to be cut by the cutter 22. At this time, the encoder detects the amount of rotation of the motor 20 to monitor whether the printing paper P is being transported at a fixed speed.

Accordingly, if the sensor 92 detects the printing paper P at a stage in which the amount of the printing paper P transported is, for instance, small, it is possible to determine that the leading end portion of the printing paper P was initially projected from the paper magazine 12 prior to loading. As a result, only the leading end portion projecting in advance from the paper magazine 12 can be cut into small pieces through a number of cutting operations.

In other words, the amount of the printing paper P to be transported freely at the time of the loading of the paper magazine 12 in the photographic printer 10 can be controlled in accordance with the state in which the leading end portion of the printing paper P projects from the paper magazine 12. Therefore, it is possible to position the leading end portion of the printing paper P while preventing the printing paper P from becoming wasted by being cut by an unnecessary amount. Further, since the leading end portion of the printing paper P is cut into small pieces through a number of cutting operations, large cuttings of the printing paper P are not produced, so that it is possible to facilitate the discharge of the cuttings from inside the photographic printer 10 having a narrow space.

Subsequently, when the printing of the printing paper P is started, the motor 20 is further rotated, and the rotational force is transmitted to the driving roller 16 via the driving belt 18, causing the driving roller 16 to rotate clockwise. As a result, the printing paper P nipped by the driving roller 16 and the nip rollers 80, 82 is fed by a predetermined amount from the paper magazine 12. Then, the printing paper P fed to the main-body side of the photographic printer 10 is cut by predetermined lengths by the cutter 22.

The printing paper P thus cut travels on the support table 46 by means of the endless belt 42, and an image is printed onto the printing paper P at the printing position G. The printing paper P is then transported to the developing apparatus 36 along the transport passage 34 to develop the printed image. As the above-described operation is repeated, the printing paper P inside the paper magazine 12 is consumed consecutively.

Meanwhile, in a case where the width or the like of the printing paper P is changed, it is necessary to replace the paper magazine 12 accommodating the printing paper P and load another paper magazine 12 in the photographic printer 10. At this time, in order to prevent the occurrence of fogging in the printing paper P, the printing paper is unwound to the state shown in FIG. 4 by means of the driving roller 16. The paper magazine 12 is then unloaded, and another paper magazine 12 is loaded. For this reason, if the paper magazine 12 to be newly loaded in the photographic printer 10 accommodates the printing paper P which has been partially consumed, the paper magazine 12 is loaded in the photographic printer 10 in the state shown in FIG. 4.

Figure 4:
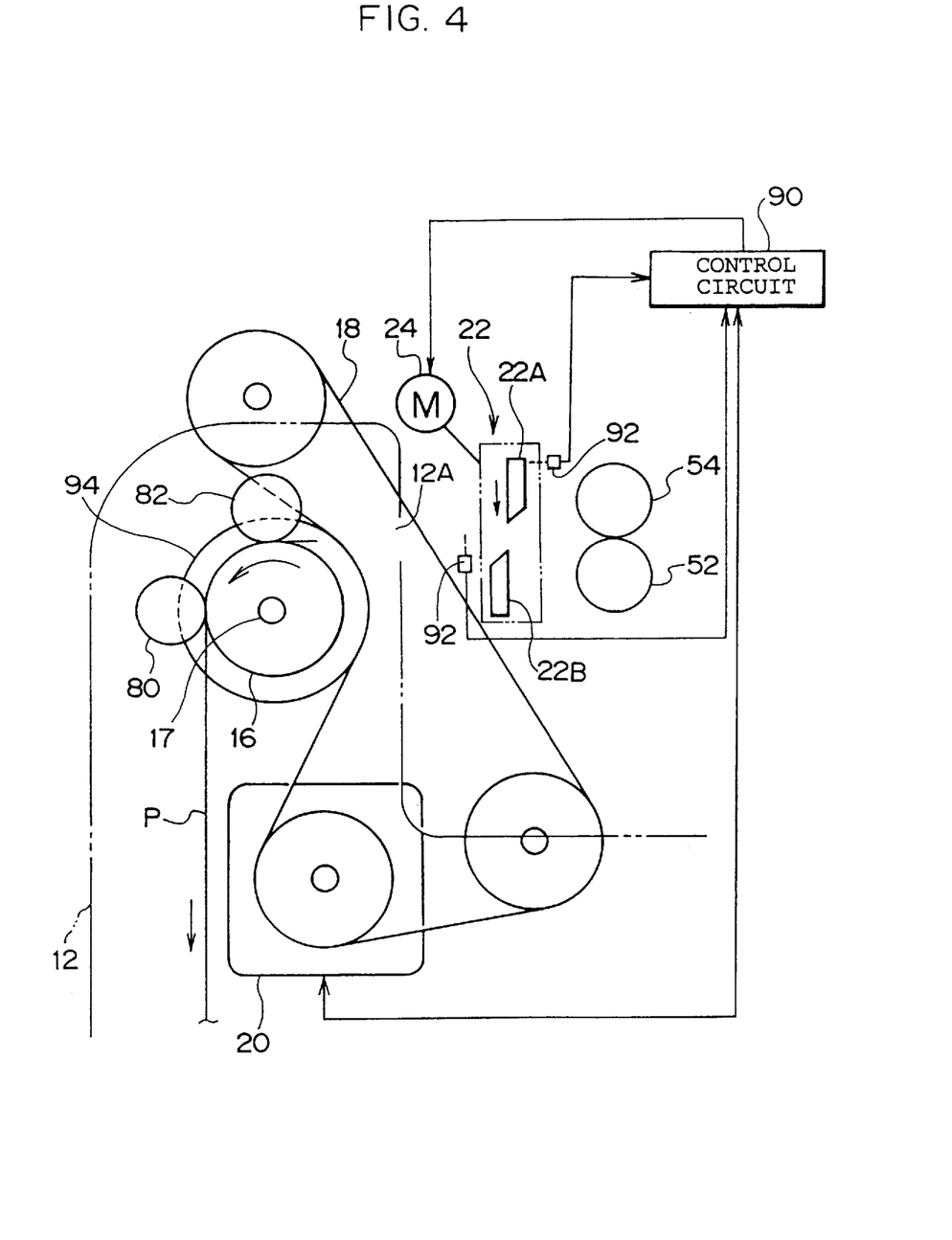
FIG. 4 is a schematic enlarged view of the cutter and surrounding structure shown in FIG. 1, and illustrates a state in which the leading end portion of the printing paper does not project from the paper magazine.

Accordingly, if the paper magazine 12 is loaded in the photographic printer 10 in the state shown in FIG. 4, since the leading end portion of the printing paper P does not project from inside the paper magazine 12 prior to the loading, the time duration until the leading end portion of the printing paper P is detected by the sensor 92 becomes long. For this reason, the control circuit 90 determines on the basis of this time duration that there is no fogged portion, and the leading end portion of the printing paper P is cut once by the cutter 22 by controlling the operation of the cutter 22. As a result, it is possible to position the leading end portion of the printing paper P, and the waste of the printing paper P is minimized.

Although, in this embodiment, the amount of the printing paper P transported is detected in the form of a time duration by the timer incorporated in the control circuit 90, the amount of the printing paper P transported may alternatively be detected directly by an encoder for detecting the amount of rotation of the motor 20. Still further, an encoder or the like may be disposed for the driving roller 16 to detect the amount of the printing paper P transported.

Although a guillotine cutter is used as the cutter, it goes without saying that it is possible to use a known cutter in which a cutter blade reciprocates with respect to the cutting plane of the printing paper P, such as a rotary cutter. Additionally, as the means for detecting the leading end portion of the printing paper P, it is possible to adopt a transmission-type sensor instead of the reflection-type sensor used in this embodiment.

Although, in this embodiment, a photographic printing paper is used as the photosensitive material, it is possible to use other types of photosensitive material such as a film other than the photographic printing paper.

What is claimed is:

1. A cutting apparatus for a photosensitive material processor, comprising:

a magazine having an elongated photosensitive material disposed therein, said magazine being detachably loaded in a main body of the processor for processing the photosensitive material;

a transporting device disposed in said magazine to feed out the photosensitive material from within said magazine to the main body of the processor, while nipping the photosensitive material;

a driving member connected to said transporting device to drive said transporting device;

a cutting member for cutting the photosensitive material fed out from said magazine to the main body of the processor;

a detecting device for detecting a leading end portion of the photosensitive material fed out from said magazine by said transporting device, the detection being carried out at a position upstream of said cutting member in a traveling direction of the photosensitive material; and a controlling means for controlling the operation of said cutting member based on an amount of the photosensitive material fed out from said magazine by said driving member until the photosensitive material is detected by said detecting device, thereby to adjust the length of the photosensitive material to be cut by said cutting member.

2. A cutting apparatus for a photosensitive material processor according to claim 1, wherein said controlling means determines the amount of the photosensitive material fed out from said magazine by detecting a time duration from start-up of said driving device until the photosensitive material is detected by said detecting device.

3. A cutting apparatus for a photosensitive material processor according to claim 1, wherein if said controlling means determines, based on the amount of the photosensitive material fed out, that the leading end portion of the photosensitive material is initially projected from said magazine, said controlling means controls operation of said cutting member so that the leading end portion of the photosensitive material is cut into pieces through a number of cutting operations.

4. A cutting apparatus for a photosensitive material processor according to claim 1, wherein if said controlling means determines, based on the amount of the photosensitive material fed out, that the leading end portion of the photosensitive material does not project from said magazine, said controlling means controls operation of said cutting member so that the leading end portion of the photosensitive material is cut once.

5. A cutting apparatus for a photosensitive material processor according to claim 1, wherein said transporting device comprises a driving roller having the photosensitive material wound around a portion of an outer periphery of said driving roller, and said driving roller is driven by said driving member.

6. A cutting apparatus for a photosensitive material processor according to claim 5, wherein said transporting device comprises a plurality of nip rollers which are respectively disposed on the outer periphery of said driving roller to nip the photosensitive material together with said driving roller.

7. A cutting apparatus for a photosensitive material processor according to claim 1, wherein said driving member has a driving source and a transmitting member for transmitting a driving force from said driving source to said transporting device.

8. A cutting apparatus for a photosensitive material processor according to claim 1, wherein said cutting member has a cutting-member driving source, said cutting-member driving source being driven through control by said controlling means.

9. A cutting apparatus for a photosensitive material processor according to claim 8, wherein said cutting member comprises a guillotine cutter which is connected to said cutting-member driving source, and cuts the photosensitive material in a thicknesswise direction of the photosensitive material.

10. A cutting apparatus for a photosensitive material processor, comprising:

a magazine having an elongated photosensitive material disposed therein, said magazine being detachably loaded in a main body of the processor for processing the photosensitive material;

a transporting device disposed in said magazine to feed out the photosensitive material from within said magazine to the main body of the processor, while nipping the photosensitive material;

a driving member connected to said transporting device to drive said transporting device;

a cutting member for cutting the photosensitive material fed out from said magazine to the main body of the processor;

a detecting device for detecting a leading end portion of the photosensitive material fed out from said magazine by said transporting device, the detection being carried out at a position upstream of said cutting member in a traveling direction of the photosensitive material; and a controlling means for controlling the operation of said cutting member based on an amount of the photosensitive material fed out from said magazine by said driving member until the photosensitive material is detected by said detecting device, wherein if said controlling means determines, based on the amount of the photosensitive material fed out, that the leading end portion of the photosensitive material is initially projected from said magazine before loading said magazine into the main body of the processor, said controlling means controls operation of said cutting member so that the projecting leading end portion of the photosensitive material is cut into pieces through a number of cutting operations, while if said controlling means determines that the leading end portion of the photosensitive material does not initially project from said magazine, said controlling means controls operation of said cutting member so that the leading end portion of the photosensitive material is cut once.

11. A cutting apparatus for a photosensitive material processor according to claim 10, wherein said controlling means determines the amount of the photosensitive material fed out from said magazine by detecting a time duration from start-up of said driving device until the photosensitive material is detected by said detecting device.

12. A cutting apparatus for a photosensitive material processor according to claim 10, wherein said transporting device comprises a driving roller having the photosensitive material wound around a portion of an outer periphery of said driving roller, and said driving roller is driven by said driving member.

13. A cutting apparatus for a photosensitive material processor according to claim 12, wherein said transporting device comprises a plurality of nip rollers which are respectively disposed on the outer periphery of said driving roller to nip the photosensitive material together with said driving roller.

14. A cutting apparatus for a photosensitive material processor according to claim 10, wherein said driving member comprises a driving motor and a driving belt for transmitting a driving force from said driving motor to said transporting device.

15. A cutting apparatus for a photosensitive material processor according to claim 10, wherein said cutting member has a cutting-member driving motor, said cutting-member driving motor being driven through control by said controlling means.

16. A cutting apparatus for a photosensitive material processor according to claim 15, wherein said cutting member comprises a guillotine cutter which is connected to said cutting-member driving motor, and cuts the photosensitive material in a thicknesswise direction of the photosensitive material.

17. A cutting apparatus for a photosensitive material processor according to claim 1, wherein the processor includes an opening/closing door and wherein said controlling means activates said transporting device to begin to feed out the photosensitive material after said magazine is set in the processor and said opening/closing door is closed.

18. A cutting apparatus for a photosensitive material processor according to claim 1, wherein the processor includes an opening/closing door and wherein said cutting member includes means for preventing movement of said cutting member unless said opening/closing door is closed.

19. A cutting apparatus for a photosensitive material processor according to claim 10, wherein the processor includes an opening/closing door and wherein said controlling means activates said transporting device to begin to feed out the photosensitive material after said magazine is set in the processor and said opening/closing door is closed.

20. A cutting apparatus for a photosensitive material processor according to claim 10, wherein the processor includes an opening/closing door and wherein said cutting member includes means for preventing movement of said cutting member unless said opening/closing door is closed.

* * * * *